Dec. 12, 1939.   A. N. BEAUBIEN   2,182,978
DISH WASHING MACHINE
Filed April 25, 1938   2 Sheets-Sheet 1
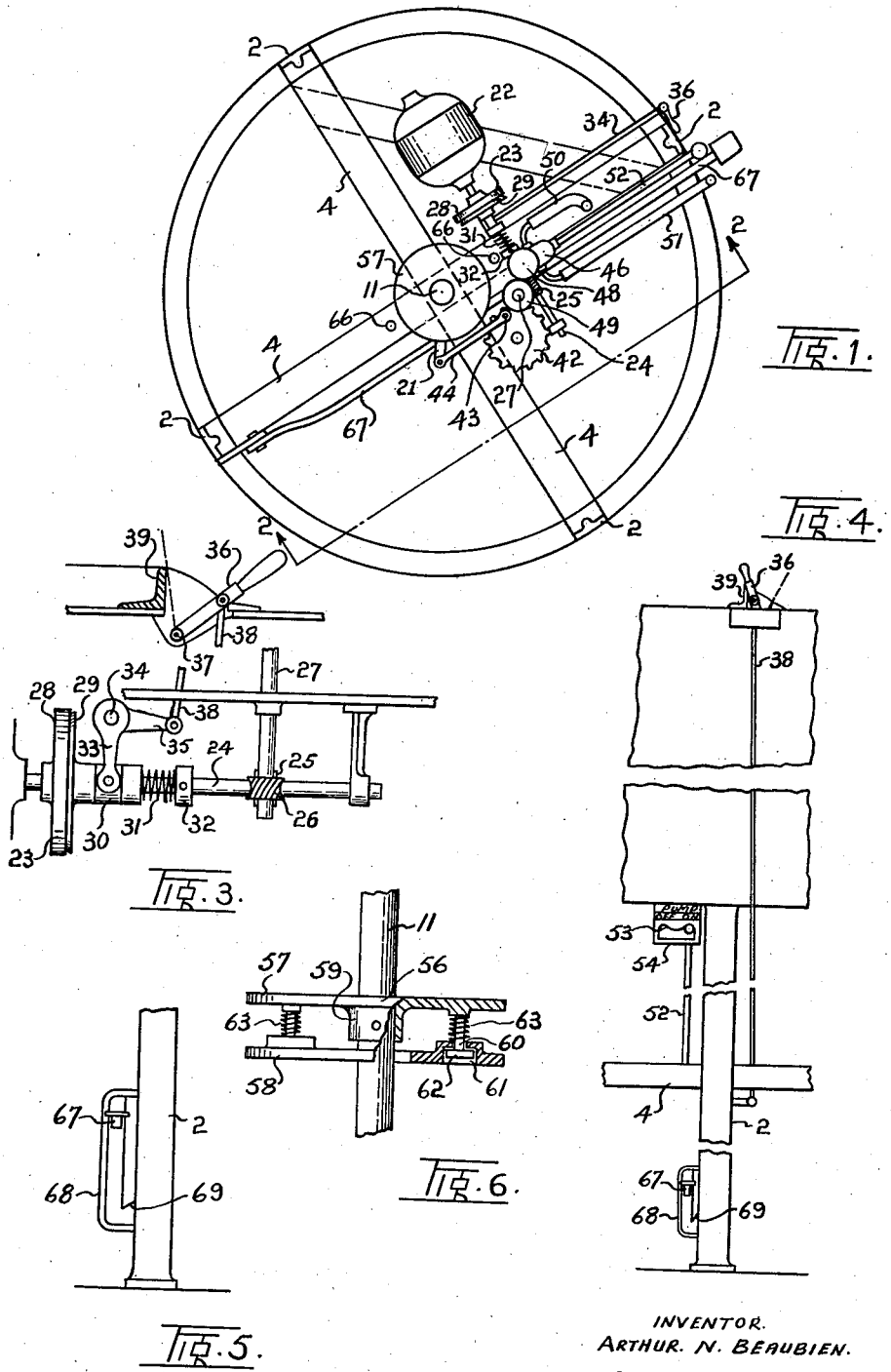
INVENTOR.
ARTHUR. N. BEAUBIEN.
Ernest E Carver
ATTORNEY.

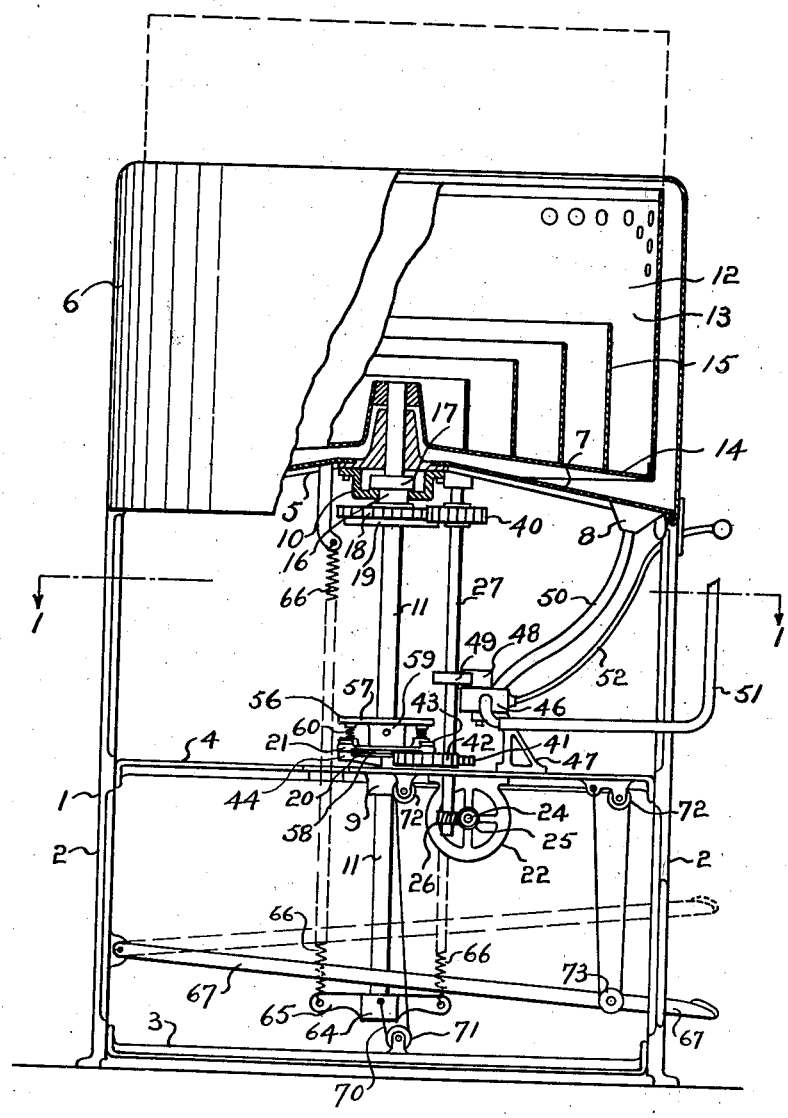

Patented Dec. 12, 1939

2,182,978

UNITED STATES PATENT OFFICE 2,182,978

DISHWASHING MACHINE

Arthur N. Beaubien, Agassiz, British Columbia, Canada

Application April 25, 1938, Serial No. 204,127

4 Claims. (Cl. 141—9)

My invention relates to improvements in dishwashing machines, the objects of which are to provide means for imparting a vertical movement to the dish carrying basket whereby when said basket is raised the water adhering to the dishes washed therein may be partially drained off and if desired, dried by centrifugal motion, and to impart an oscillating movement to the basket when the basket is in its lowermost position. A further object is to provide in conjunction with the driving mechanism of the machine a pump for operating a rotary brush for scrubbing adherent particles of food from the dishes, if required, when the basket is at rest.

The invention consists of a tank in which a basket is mounted upon a vertical axis and means are provided for raising the basket to project above the top of the tank and means for rotating and rocking the basket about its axis, as will be more fully described in the following specification and shown in the accompanying drawings, in which:

Fig. 1 is a sectional plan view of the driving mechanism taken on the line 1—1 of Figure 2.

Fig. 2 is a vertical sectional view taken on the line 2—2 of Figure 1.

Fig. 3 is a detail view showing the motor clutch control.

Fig. 4 is a fractionated elevational view showing the disposition of the controls of the pump and of the motor clutch.

Fig. 5 is a fractionated elevational view showing the slide in which the foot lever moves.

Fig. 6 is a sectional view of the basket drive clutch structure.

In the drawings like characters of reference indicate corresponding parts in each figure.

The numeral 1 indicates a base consisting of legs 2, cross connected by transverse members 3, 4 and 5. Mounted upon the upper part of the base and the transverse member 5 is a cylindrical tank 6 having a conical bottom wall 7 in which an outlet 8 is provided. Bearings 9 and 10 are provided respectively in the transverse members 4 and 5 in which a main shaft 11 is slidably and rotatably mounted. The upper end of the shaft is fitted with a cylindrical basket 12 having perforated side walls 13 and a conical bottom wall 14 which is also perforated in any desired manner to permit a free flow of water between the tank 6 and the basket 12. The basket is suitably divided with concentric walls 15 to support dishes in an appropriate position for washing and draining.

Suspended from the bearing 10 and freely rotatable therein and about the shaft 11 is a sleeve 16 having a collar 17 above the bearing and a gear wheel 18 below, which is provided on its under surface with a clutch plate 19. Rockingly mounted upon the shaft 11 and resting upon the bearing 9 is a clutch plate 20 having a projecting crank 21 the purpose of which will hereinafter appear.

A motor 22 is supported from the transverse member 4 which drives through a clutch assembly 23 an aligned shaft 24 having at its outer end a worm 25 which engages a worm wheel 26 upon a vertical shaft 27. The clutch assembly 23 consists of a clutch member 28 carried by the motor and a coacting clutch member 29 slidably and non-rotatably mounted upon the shaft 24. The clutch member 29 is fitted with a trunnion collar 30. A spring 31 butting against a collar 32 urges the clutch members into engagement. The clutch member 29 is moved to disengaged position by a fork 33 fitted upon a horizontal shaft 34 which is fitted at its outer end with a crank 35.

A hand lever 36 is fulcrumed on a pin 37 which is fitted in a convenient position adjacent the rim of the tank, see Figure 4. The lever is connected intermediate its length by connecting rod 38 to the free end of the crank 35 and is adapted, on being moved upwardly, to its ultimate position to throw over centre and come to rest against a stop 39. When the clutch is disengaged the lever 36 will be in the position shown in dotted line in Figure 3.

The shaft 27 is fitted with a pinion 40 which drives the gear 18 and a pinion 41 which drives a gear 42 having upon its upper face a crank pin 43, and the crank pin 43 is operatively connected to the crank 21 of the clutch plate 20 by a pitman 44. A gear pump 46 is oscillatingly mounted upon a standard 47 and is fitted with a friction wheel 48 which is adapted to be brought into driving contact with a similar friction wheel 49 fitted upon the vertical shaft 27. The pump 46 is fitted with a flexible suction hose 50 which communicates with the base of the tank 6 and a delivery hose 51 which is available for use in driving a hydraulic brush of any suitable type, not shown, which would be fitted to the end of the hose for washing adherent material from dishes in the basket 12. The pump 46 is rocked to bring the friction wheels 48 and 49 into or out of engagement by a slightly resilient lever 52, which extends beyond the periphery of the tank and engages a cam 53 formed in a cam plate 54.

Secured upon the shaft 11 is a driving member 56 consisting of upper and lower clutch plates 57 and 58 respectively. The upper clutch plate is provided with a boss 59 by which it is fitted to the shaft and is also provided with a plurality of circumferentially arranged pins 60 which pass through the bases of inverted pockets 61 formed in the lower clutch plate. These pins are provided with heads 62 at their lower ends to limit the downward movement of the lower plate and are fitted with springs 63 to press said plate in a downward direction, so that when the shaft 11 is brought down to its lowermost position the lower plate 58 is resiliently held in driving contact with the clutch plate 20 that oscillating movement may be imparted to the shaft 11 and the basket 12 through the pitman 44.

The shaft 11 is provided with a step bearing 64 having opposed radial arms 65 and is suspended by said arms by springs 66 which normally hold the basket and also its load in raised position with the upper clutch plate 57 in driving contact with the clutch plate 19.

A foot lever 67 is pivotally mounted from one of the legs 2 and extends across the machine to a convenient position below the other controls, the free end of this lever moves through a slotted plate 68 having a stop 69 adjacent its lower end below which the lever may be latched when in its lowermost position.

A light cable 70 is anchored to the step bearing 64 and passes around a pulley 71 mounted on the transverse member 3, a pair of pulleys 72 mounted below the transverse member 4, around a pulley 73 on the foot lever 67 and anchored to the transverse member 4, so that a downward pressure on the foot lever will draw the shaft 11 and the basket downwardly to the position shown in Figure 2.

In operating the machine, the basket 12 is filled while in the position shown and water is run into the tank. The motor is switched on and the hand lever 36 is moved in an appropriate direction to engage the clutch members 28 and 29 thus permitting the motor to rock the shaft 11 through the pitman 44, the clutch plate 20 and the clutch plate 58 of the driving member 56. The rocking motion thus set up causes a swirling motion to the water and washes the dishes in the basket. When the washing is presumed to be done, the pedal 67 is released from its stop 69 and allowed to rise by the action of the springs 66, which raise the basket above the water line in the tank and bring the clutch plate 56 into engagement with the clutch plate 19. The clutch plate 19 is at this time being rotated, consequently rotation will be imparted to the basket to throw off adherent water from the dishes. By virtue of the contact between the clutch plates 57 and 19 being exerted by the springs 66, the drive is taken up slowly and without shock which might otherwise disturb the dishes in the basket. Should the shaft be rotating when the basket is lowered the spring thrust upon the lower clutch plate 58 when being brought into engagement with the plate 20 causes the oscillating drive to be taken up also without shock. If any particles of food adhere to the dishes after washing, the lever 52 is depressed and swung to the right, bringing the friction wheels 48 and 49 into contact and setting the pump in motion to deliver water under pressure through the hose and any washing tool that may be connected thereto, so that with this the particles of food may be dislodged. The inherent spring of the lever 52 in tending to ride up the slope of the cam 53 ensures positive driving engagement or positive disengagement between the wheels 48 and 49.

What I claim as my invention is:

1. A dishwasher comprising a tank having a vertical shaft and a basket supported upon said shaft, a gear and a crank freely rotatable about the shaft, a clutch member associated with the gear and a clutch member associated with the crank, means for imparting rotation to the gear and a rocking movement to the crank, a driving member having clutch elements non-slidably secured to the shaft and means for imparting endwise movement to the shaft and the driving member secured thereto to bring the driving member into engagement with the clutch member of the gear as the shaft is raised and to bring the driving member into engagement with the clutch member of the crank as the shaft is lowered.

2. A dishwasher comprising a tank having a vertical shaft and a basket supported on the shaft, said shaft being endwise movable, spring means for supporting the shaft and basket in raised position, and means for lowering said shaft and basket, means for rotating the shaft when in raised position, and means for rocking the shaft when in lowered position.

3. A dishwasher comprising a tank having a vertical shaft and a basket supported on the shaft, said shaft being endwise movable, spring means for supporting the shaft and basket in raised position, and means for lowering said shaft and basket, driving means for rotating the shaft when in raised position and driving means for rocking the shaft when in lowered position, a spring tensioned clutch interposed between one of the driving means and the shaft and a plate clutch interposed between the other driving means and the shaft, the shaft supporting spring means serving as a resilient clutch tensioning means when the shaft is in raised position.

4. In a dishwasher having a tank, an endwise movable vertical shaft and a basket supported upon the shaft, a prime mover for rotating the shaft, a driving member secured to the shaft having a fixed clutch plate and a floating clutch plate below the fixed clutch plate, said floating clutch plate being resiliently urged away from said fixed clutch plate, complementary upper and lower clutch plates concentrically mounted upon the shaft, and means for imparting rotational movement to the concentrically mounted clutch plates from the prime mover, spring means for raising the shaft to bring the fixed clutch plate into resilient driving engagement with the upper clutch plate, and means for lowering the shaft and bringing the floating clutch plate into engagement with the lower clutch plate.

ARTHUR N. BEAUBIEN.